US011268379B2

(12) United States Patent
Price Hoelscher et al.

(10) Patent No.: US 11,268,379 B2
(45) Date of Patent: Mar. 8, 2022

(54) METHODS OF FORMULATING CONDUCTIVE WELLBORE FLUIDS

(71) Applicant: M-I L.L.C., Houston, TX (US)

(72) Inventors: Brandi Katherine Price Hoelscher, Houston, TX (US); Cara Bovet, Houston, TX (US); Albert Okhrimenko, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 223 days.

(21) Appl. No.: 16/097,825

(22) PCT Filed: May 3, 2017

(86) PCT No.: PCT/US2017/030740
§ 371 (c)(1),
(2) Date: Oct. 30, 2018

(87) PCT Pub. No.: WO2017/192656
PCT Pub. Date: Nov. 9, 2017

(65) Prior Publication Data
US 2019/0119551 A1  Apr. 25, 2019

Related U.S. Application Data

(60) Provisional application No. 62/331,317, filed on May 3, 2016, provisional application No. 62/331,332, filed on May 3, 2016, provisional application No. 62/331,298, filed on May 3, 2016, provisional application No. 62/435,454, filed on Dec. 16, 2016, provisional application No. 62/435,404, filed on Dec. 16, 2016, provisional application No. 62/435,510, filed on Dec. 16, 2016, provisional application No. 62/435,475, filed on Dec. 16, 2016, provisional application No. 62/435,384, filed on Dec. 16, 2016.

(51) Int. Cl.
E21B 49/00 (2006.01)
E21B 21/00 (2006.01)
E21B 7/00 (2006.01)
E21B 33/138 (2006.01)
E21B 47/00 (2012.01)
E21B 47/12 (2012.01)
E21B 47/01 (2012.01)

(52) U.S. Cl.
CPC .............. *E21B 49/00* (2013.01); *E21B 7/00* (2013.01); *E21B 21/003* (2013.01); *E21B 33/138* (2013.01); *E21B 47/00* (2013.01); *E21B 47/01* (2013.01); *E21B 47/12* (2013.01)

(58) Field of Classification Search
None
See application file for complete search history.

(56) References Cited

U.S. PATENT DOCUMENTS

| 2,717,239 | A | | 9/1955 | Fischer | |
| 2,749,503 | A | | 6/1956 | Doll | |
| 3,559,735 | A | * | 2/1971 | Corrin | C09K 8/92 |
| | | | | | 166/275 |
| 5,080,773 | A | * | 1/1992 | Tatum, Jr. | H01R 4/66 |
| | | | | | 174/6 |
| 5,902,517 | A | | 5/1999 | Thielen | |
| 6,770,603 | B1 | | 8/2004 | Sawdon et al. | |
| 2004/0116303 | A1 | | 6/2004 | Thaemlitz | |
| 2006/0225880 | A1 | | 10/2006 | Radzinski et al. | |
| 2008/0173481 | A1 | | 7/2008 | Menezes et al. | |
| 2010/0126252 | A1 | | 5/2010 | Bailey et al. | |
| 2011/0111988 | A1 | | 5/2011 | Ionescu Vasii et al. | |
| 2011/0254553 | A1 | | 10/2011 | Van Zanten | |
| 2012/0131996 | A1 | | 5/2012 | Anish et al. | |
| 2013/0030707 | A1 | | 1/2013 | Tabarovsky et al. | |
| 2013/0112409 | A1 | * | 5/2013 | Baleno | C09K 8/68 |
| | | | | | 166/278 |
| 2015/0284619 | A1 | | 10/2015 | Price Hoelscher et al. | |
| 2015/0368539 | A1 | | 12/2015 | Tour et al. | |
| 2016/0017201 | A1 | | 1/2016 | Yang | |
| 2016/0356919 | A1 | | 12/2016 | Jamison et al. | |
| 2017/0096593 | A1 | | 4/2017 | Step et al. | |

FOREIGN PATENT DOCUMENTS

| WO | 2000041480 | A2 | 7/2000 |
| WO | 2008083049 | A2 | 7/2008 |
| WO | 2011050061 | A2 | 4/2011 |
| WO | 2014/066295 | A1 | 5/2014 |
| WO | 2015/148793 | A1 | 10/2015 |
| WO | 2016014512 | A1 | 1/2016 |

(Continued)

OTHER PUBLICATIONS

ISO 8942:2010 "Rubber compounding ingredients—Carbon black—Determination of individual pellet crushing strength" <https://www.iso.org/obp/ui/>, accessed Oct. 8, 2020.*
International Preliminary Report on Patentability issued in International patent application PCT/US2017/030719 dated Nov. 6, 2018, 11 pages.
International Preliminary Report on Patentability issued in International patent application PCT/US2017/030727 dated Nov. 15, 2018, 15 pages.
International Preliminary Report on Patentability issued in International patent application PCT/US2017/030733 dated Nov. 6, 2018, 12 pages.
International Preliminary Report on Patentability issued in International patent application PCT/US2017/030740 dated Nov. 6, 2018, 7 pages.

(Continued)

Primary Examiner — Andrew Sue-Ako

(57) ABSTRACT

A method of formulating an oil-based wellbore fluid, the method comprising adding at least a plurality of conductive carbon black agglomerates or pellets having an average size of at least 500 μm to an oleaginous base fluid, and applying energy to the oil-based wellbore fluid to disperse the plurality of conductive carbon black agglomerates or pellets into the oleaginous base fluid as finer particles than the agglomerates or pellets.

17 Claims, No Drawings

(56) References Cited

FOREIGN PATENT DOCUMENTS

| WO | 2016014525 | A1 | 1/2016 |
| WO | 2017/192646 | A1 | 11/2017 |
| WO | 2017/192652 | A1 | 11/2017 |
| WO | 2017/192656 | A1 | 11/2017 |
| WO | 2017192642 | A1 | 11/2017 |

OTHER PUBLICATIONS

International Search Report and Written Opinion for the equivalent International patent application PCT/US2017/030719 dated Aug. 10, 2017.
International Search Report and Written Opinion for the equivalent International patent application PCT/US2017/030740 dated Aug. 16, 2017.
International Search Report and Written Opinion for the equivalent International patent application PCT/US2017/030727 dated Aug. 17, 2017.
International Search Report and Written Opinion for the equivalent International patent application PCT/US2017/030733 dated Aug. 17, 2017.
Office Action issued in U.S. Appl. No. 16/097,821 dated Dec. 1, 2020, 15 pages.
Office Action issued in U.S. Appl. No. 16/099,160 dated Apr. 13, 2021, 13 pages.
Exam Report letter issued in United Kingdom Patent Application No. GB1819688.1 dated Jul. 20, 2021, 2 pages.

* cited by examiner

METHODS OF FORMULATING CONDUCTIVE WELLBORE FLUIDS

BACKGROUND

The use of wireline well logs is well known in the art of drilling subterranean wells and in particular oil and gas wells. A wireline log is generated by lowering a logging tool down the well on a wireline. The tool is slowly brought back to the surface and the instruments on the logging tool take measurements that characterize the formations penetrated by the well in addition to other properties of the well. For example, during logging, wireline logs may use measurements of relative resistivity of the formation to determine geological composition of the downhole formation. Also, during drilling, such resistivity measurements may be useful to determine the location of the drill bit to enhance geo-steering capabilities and directional drilling control. Thus, electrical logs and other wireline log techniques are depended upon in the oil and gas exploration industry to determine the nature of the geology and the reservoir properties of the petroleum bearing formations penetrated by the well, as well as other properties of the drilling process. Further, wireline well logs are often the only record of a formation penetrated by a well that are available for correlation amongst different wells in a particular field.

When an electrical wireline is introduced into a well, electrodes on the well logging tool are in contact with wellbore fluid or filter cake and hence the formation rocks through which the well has penetrated. An electrical circuit is created and the resistance and other electrical properties of the circuit may be measured while the logging tool is retracted from the well and/or pulled across the surface of the wellbore. In conventional wellbore logging, the measurement of resistivity involves the presence of a highly conductive path between the logging tool and the formation (i.e., through the wellbore fluid). The resulting data is a measure of the electrical properties of the drilled formations versus the depth of the well. The results of such measurements may be interpreted to determine the presence or absence of petroleum or gas, the porosity of the formation rock, and other properties of the well.

An alternative or supplement to wireline logging involves logging tools placed in a specialized drill collar housing and run in the drill string near the bit. This technique is known as logging-while-drilling (LWD) or formation-evaluation-while-drilling (FEWD). Measurements such as electrical resistivity may be thereby taken and stored downhole for later retrieval during a "tripping out" of the drill string, or transmitted to the surface via mud-pulse telemetry.

The use of resistivity logging tools is often limited mainly to cases where an oil-based wellbore fluid is used for the drilling operations because the low conductivity of the base-oil in the case of oil/synthetic-based wellbore fluids precludes the use of resistivity tools in such fluids. For example, when invert emulsion fluids are used, any electrical path through the fluid is insulating due to the non-conductive nature of the external oil phase. This severely limits the amount and clarity of resistivity information that may be gathered from a wellbore using wireline logging.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of formulating an oil-based wellbore fluid, the method including adding at least a plurality of conductive carbon black agglomerates or pellets having an average size of at least 500 μm to an oleaginous base fluid and applying energy to the oil-based wellbore fluid to disperse the plurality of conductive carbon black agglomerates or pellets into the oleaginous base fluid as finer particles than the agglomerates or pellets.

In another aspect, embodiments of the present disclosure relate to a method of formulating an oil-based wellbore fluid, the method including providing an oleaginous base fluid, providing a plurality of conductive carbon black agglomerates or pellets having an average size of at least 500 μm, adding the plurality of conductive carbon black agglomerates or pellets to the oleaginous based fluid and applying energy to the oil-based wellbore fluid to disperse the plurality of conductive carbon black agglomerates or pellets into the oleaginous base fluid as finer particles than the agglomerates or pellets.

Other aspects and advantages of the claimed subject matter will be apparent from the following description and the appended claims.

DETAILED DESCRIPTION

Generally, embodiments disclosed herein relate to electrically conductive wellbore fluids and methods of formulating and using the same. More specifically, embodiments disclosed herein relate to oil-based wellbore fluids for downhole applications formed of an oleaginous base fluid and a plurality of conductive carbon black agglomerates or pellets having an average size of at least 500 μm. The inventors of the present disclosure have found that the addition of a plurality of conductive carbon black agglomerates or pellets to an oleaginous-based wellbore fluid may provide electrical conductivity to the oil-based wellbore fluid, allowing for electrical logging (such as electrical resistivity measurements) of the subterranean well. Furthermore, the oil-based wellbore fluids of the present disclosure may provide reduced environmental and health risks, as the carbon black agglomerates or pellets added to the oleaginous base fluid are dispersed into the oleaginous base fluid as finer particles than the agglomerates or pellets.

The use of oil-based muds and wellbore fluids has become increasingly popular since the introduction of the technology in the 1950's. Innovations in oil-based muds and wellbore fluids are of ongoing importance with the development of environmentally friendly wellbore fluids and fluids having other special characteristics. Oil-based muds offer advantages over water-based muds in many drilling situations. In particular, oil-based muds are known in the art to provide excellent shale inhibition, borehole stability, lubricity, thermal stability, tolerance of contamination, and ease of maintenance. However, oil-based muds and wellbore fluids also have some disadvantages. One disadvantage is that normal resistivity cannot be taken when the well has been drilled with a conventional oil-based mud or wellbore fluid due to the non-conductive nature of the oil-based wellbore fluids and muds. Said another way, when invert emulsion fluids are used, any electrical path through the fluid is highly resistive due to the nature of the external oil phase. The resistive nature of oil-based wellbore fluids severely limits the amount and clarity of resistivity information that may be gathered from a wellbore using wireline logging, while also requiring the use of high frequencies for the measurements (10 MHz to 100 MHz).

In the present disclosure, certain details are set forth such as specific quantities, concentrations, sizes, etc. so as to provide a thorough understanding of the various embodiments disclosed herein. However, it will be apparent to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

The oil-based wellbore fluids of the present disclosure may include fluids that are substantially comprised of an oleaginous liquid as a base fluid, as well as emulsions of oleaginous and non-oleaginous fluids. In particular, various embodiments of the present disclosure may provide for an invert emulsion wellbore fluid. "Invert emulsion," as used herein, is an emulsion in which a non-oleaginous fluid is the discontinuous phase and an oleaginous fluid is the continuous phase.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

"Non-oleaginous liquid," as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

In the process of rotary drilling a well, a wellbore fluid or mud is circulated down the rotating drill pipe, through the bit, and up the annular space between the pipe and the formation or steel casing, to the surface. The wellbore fluid performs many different functions. For example, it removes cuttings from the bottom of the hole to the surface, suspends cuttings and weighting material when the circulation is interrupted, controls subsurface pressure, isolates the fluids from the formation by providing sufficient hydrostatic pressure to prevent the ingress of formation fluids into the wellbore, cools and lubricates the drill string and bit, maximizes penetration rate, etc. An objective in drilling a well is also to secure the maximum amount of information about the type of formations being penetrated and the type of fluids or gases in the formation. This information is obtained by analyzing the cuttings, by electrical logging technology and by the use of various downhole logging techniques, including electrical measurements.

Various logging and imaging operations are performed during the drilling operation, for example, they may be performed after drilling sections in the reservoir region of an oil/gas well in order to determine the type of formation and the material therein. Such information may be used to optimally locate the pay zone, i.e., where the reservoir is perforated in order to allow the inflow of hydrocarbons into the wellbore.

Some logging tools work on the basis of a resistivity contrast between the fluid in the wellbore (wellbore fluid) and that already in the formation. These are known as resistivity logging tools. Briefly, alternating current flows through the formation between two electrodes. Thus, the fluids in the path of the electric current are the formation fluids and the fluid that has penetrated the formation by way of filtration. The filtercake and filtrate result from filtration of the mud over a permeable medium (such as formation rock) under differential pressure.

The use of resistivity logging tools is often limited to cases where a water-based wellbore fluid is used for the drilling operations because the low conductivity of the base-oil in the case of oil/synthetic-base wellbore fluids precludes the use of resistivity tools in such fluids. The case is similarly true for invert emulsion wellbore fluids, since when invert emulsion fluids are used, any electrical path through the fluid is insulated due to the non-conductive nature of the external oil phase. In other words, even though the brine dispersed in the oil phase is electrically conductive, the discontinuous nature of the droplets prevents the flow of electricity. Indeed, the inability of these emulsions to conduct electricity (until a very high potential difference is applied) is used as a standard test of emulsion stability. The non-conductive nature of invert emulsion wellbore fluids severely limits the amount and clarity of resistivity information that may be gathered from a wellbore using wireline logging.

According to the present embodiments, the methods may include placing oil-based wellbore fluids into the subterranean well, including oil-based fluids such as invert emulsions, and adding conductive carbon materials that may increase the electrical conductivity of the wellbore fluids, enabling electrical logging. Specifically, the oil-based wellbore fluids of the present disclosure may incorporate carbon materials which are added to the oleaginous base fluid in such an amount that the wellbore fluid and/or the resulting filtercake formed from the wellbore fluid is electrically conductive and useful in any application where conductive wellbore fluids have been previously employed, including for example, electrical logging of the subterranean well. In such embodiments, the oleaginous-based wellbore fluids of the present disclosure may be formulated so as to enable one to take electrical log measurements of the subterranean well, despite the naturally low conductivity of oleaginous fluids, generally.

It is also envisioned that the oil-based wellbore fluids of the present disclosure may form a conductive filtercake on the wellbore walls, even if the fluid itself is not conductive. In such embodiments, the carbon materials of the present disclosure may allow for the formation of a conductive filtercake at particle loading levels that enable formulation of a wellbore fluid that meets the rheological profile window suitable for use in drilling. Thus, one or more embodiments may include the drilling of a subterranean well with an oleaginous-based wellbore fluid described herein so as to allow formation of a conductive filtercake by filtration of a portion of the fluid phase into a permeable formation. As described herein, the conductive filtercake may enable electrical logging.

In some embodiments, during logging and while using oil-based wellbore fluids and carbon materials as described herein, logs may be used to take measurements of relative resistivity of the formation. The measurements of relative resistivity of the formation may be used to determine the geological composition of the downhole formation. In some embodiments, the wellbore fluids and carbon materials disclosed herein may be used with drilling systems having a logging tool provided thereon so that the drilling and formation data and parameters may be determined from various downhole measuring devices and may be measured and then transferred to the surface.

Carbon Materials

While there have been previous attempts to increase the conductivity of an oil-based fluid, such attempts heretofore have resulted in fluids that are not, in fact, usable in a drilling application. Specifically, in some instances, the loading requirements for the conductive particles exceeded pumpability requirements, while in others, the particles failed to disperse and remain suspended in the fluid. In contrast, the present inventors have advantageously found that the carbon materials of the present disclosure included as a plurality of agglomerates or pellets into the wellbore fluid, may improve the electrical logging of the well by increasing the electrical conductance of the wellbore fluid. Furthermore, it is also envisioned that the same or similar results may be achieved with non-carbon materials with characteristics similar to those detailed below but formed of other elements or having a composition that contains elements other than carbon. However, in particular embodiments of the present disclosure, the fluid may incorporate one or more carbon materials in an amount that makes the fluid itself conductive, which might be used, for example, in low permeability formations that have minimal filtercake formed. Further, it is also envisioned that such materials may be added to the fluid in an amount that does not render the fluid "conductive" but in an amount that makes the oil-based filtercake formed therefrom electrically conductive. The carbon materials described herein may be added to any oil-based wellbore fluid, or a custom wellbore fluid formulation may be prepared.

In one or more embodiments, the carbon materials of the present disclosure may be added to the wellbore fluid in amounts that range from about 0.5 to 30 pounds per barrel (1.43 to 85.59 kg/m$^3$, or in amounts from about 1 to 25 pounds per barrel (2.85 to 71.33 kg/m$^3$), or in amounts from about 1.5 to 20 pounds per barrel (4.275 to 57.06 kg/m$^3$). In more particular embodiments, the carbon black materials of the present disclosure may be added to the wellbore fluid (and result in a conductive filtercake) in amounts that range from about 1 to 8 pounds per barrel (2.85 to 22.8 kg/m$^3$) or in amounts from about 1.5 to 7.0 pounds per barrel (4.275 to 21.375 kg/m$^3$), or in amounts from about 2 to 6 pounds per barrel (5.71 to 17.12 kg/m$^3$). Generally, the inventors have found that when working within lower permeability formations a higher loading level of carbon black materials may be needed to achieve the necessary logging conditions.

Carbon materials in accordance with embodiments of the present disclosure may be carbon black, a particulate form of carbon that has high surface area and short to medium range intraparticulate ordering (i.e., paracrystalline ordering) of a graphite-like carbon lattice. Types of carbon black may include ivory black, vine black, furnace black, thermal black, acetylene black, and the like. The carbon black material that has shown utility in the present disclosure is conductive carbon black. Such form of carbon black is formed over a longer time scales and at high temperature and therefore, the conductive carbon black particles are highly ordered and predominantly spherical. Because of the ordered structure, conductive carbon black may have large numbers of aromatic carbons on the surface of the constituent particles, which may be useful in increasing electrical conductivity of wellbore fluids that contain such type of material. Generally, conductive carbon black may have a morphology that includes aggregates of a plurality of primary carbon black particles. The conductive carbon black aggregates of the present application are characterized as discrete and rigid masses of physically fused primary carbon black particles.

These primary conductive carbon black aggregates may be provided in the form of larger agglomerates or pellets which are subsequently broken down into the primary conductive carbon black aggregates upon shearing during the formulation into the wellbore fluids of the present disclosure. Upon applying energy to the wellbore fluid, the agglomerates or pellets may be dispersed into the oleaginous base fluid as aggregates or even finer particles than the aggregates. In such embodiments, the more pelletized the conductive carbon black aggregates, the more energy may take to disperse them into the system. For example, in one or more embodiments, the dispersion methods may include mixing, stirring, sonicating, or combinations thereof. In various embodiments, the amount of shear used to create an emulsion may provide enough energy to disperse the pellets of the present disclosure into finer particles. For example, the applied shear rate may range from about 1000 to about 10,000 s$^{-1}$, and upon application of such shear rate for 5 minutes, the finer particles may disperse into the fluid and provide for conductivity. While conductivity is achieved within 5 minutes, the resulting fluid may also maintain its conductivity upon exposure to such shear rates for prolonged periods of time (hours or days). It is also envisioned that the fluid and particles formed upon dispersion of the pellets may survive (retain conductivity) upon exposure to higher shear rates, such as 20,000 s$^{-1}$ applied for shorter periods of time (1 minute). According to the present embodiments, the finer particles resulted upon dispersion of the conductive carbon black agglomerates or pellets maintain their physical and electrical characteristics in the presence of the fluid in which they are dispersed.

In one or more embodiments, the conductive carbon black aggregates may be formed using primary carbon black particles, where the particles may be supplied as agglomerates (of aggregates of primary particles) having an average particle size of more than 50 microns, at least 100 microns, 200 microns, 500 microns or 1 mm. Upon dispersion into the fluid, the agglomerates may break down into aggregates of an average particle size of less than 10 microns, less than 5 microns, less than 2 microns or less than 1 micron.

As mentioned above, the conductive carbon black aggregates may be formed from a plurality of physically fused primary carbon black particles. In one or more embodiments, the primary carbon black particles are non-spheroidal and in fact, have an egg-shell particle form that is similar to an open shell or a hollow shell. For example, the interior of the shell may be completely enclosed by the shell or there may be a partial shell surrounding the interior. The "effective" diameter of the carbon black primary particles may be from about 5 nm to about 150 nm or from about 20 nm to about 115 nm. It is also envisioned that the conductive carbon black agglomerates or pellets in accordance with embodiments disclosed herein may be formed by mixing carbon black aggregates with a binder solution, such as a copolymeric or polymeric solution. The resulting product may be dried under a specific temperature to the desired water content, and is then extruded and cut up finely and dried, with the formation of carbon black agglomerates.

The primary carbon black particles fuse together during production of the carbon black in the oven/furnace to form aggregates that may have a branched and fibroid-like structure, which may further entangle to form the agglomerate. In one or more embodiments, a circumscribing sphere encompassing a conductive carbon black aggregate of the present disclosure may have a diameter from about 60 nm to 3 micrometers. In yet another embodiment, the average size of the conductive carbon black aggregate may range from about 1 mm to about 3 mm. In one or more embodiments, a circumscribing sphere encompassing a carbon black aggregate of the present disclosure may have a diameter between about 1 micrometer and 5 millimeters in size.

The branched and fibroid-like structure (as well as egg-shell primary particle structure) may result in a relatively high pore volume, particular when considering the size of the aggregates. In one or more embodiments, a carbon black according to the present disclosure may have a pore volume, when measured using Di-Butyl-Phthalate (DBP) absorption method, of at least about 200 cm$^3$ DBP/100 g carbon black and up to about 500 cm$^3$ DBP/100 g carbon black. Carbon black aggregates with these values have a low bulk density and a highly branched structure, which may serve to provide better contact between aggregates and therefore a better three dimensional network of conductive aggregates at lower loadings in a filtercake (and thus a fluid that forms the filtercake), for example.

The egg-shell primary particle structure also contributes to a higher surface area for the aggregates. In one or more embodiments, the carbon black may have a surface area between about 125 and 1500 m$^2$/g. In more particular embodiments, the carbon black may have a surface area of at least about 200 m$^2$/g, or at least about 500 m$^2$/g, or at least about 700 m$^2$/g, or at least about 800 m$^2$/g, or at least about 900 m$^2$/g, or at least about 1000 m$^2$/g, or at least about 1100 m$^2$/g, or at least about 1200 m$^2$/g, or at least about 1300 m$^2$/g, or at least 1400 m$^2$/g and/or up to 1500 m$^2$/g.

Collectively, the high pore volume and high surface area may allow for greater conductivity efficiency. This efficiency may be represented by the value of the loading multiplied by the surface area of the carbon materials, a number which may be hereinafter referred to as the "surface area loading factor". In one or more embodiments, wellbore fluids of this disclosure have a value of the loading (in pounds per barrel) multiplied by the surface area (in m$^2$/g) of the carbon materials of at least 2000 lbm$^2$/gbbl, or at least 2250 lbm$^2$/gbbl, or at least 2500 lbm$^2$/gbbl, or at least 2750 lbm$^2$/gbbl, or at least 3000 lbm$^2$/gbbl. In one or more embodiments, wellbore fluids of this disclosure have a value of the loading (in pounds per barrel) multiplied by the surface area (in m$^2$/g) of the carbon materials of at most 4500 lbm$^2$/gbbl, or at most 4000 lbm$^2$/gbbl. Such a "surface area loading factor" is dependent on both the surface area and loading, and thus theoretically can be achieved by simply increasing the loading. However, as discussed above, the carbon black materials of the present disclosure may be added to the wellbore fluid in amounts as low as 0.5 pounds per barrel (1.43 kg/m$^3$) with a maximum amount of up to 30 pounds per barrel (85.59 kg/m$^3$), or a maximum amount up to 25 pounds per barrel (71.33 kg/m$^3$), or a maximum amount up to 20 pounds per barrel (57.06 kg/m$^3$), or a maximum amount up to 15 pounds per barrel (42.8 kg/m$^3$), or a maximum amount up to about 10 pounds per barrel (28.53 kg/m$^3$). In more particular embodiments, the carbon black materials of the present disclosure may be added to the wellbore fluid in amounts that range from about 1 to 8 pounds per barrel (2.85 to 22.8 kg/m$^3$) or in amounts from about 1.5 to 7.5 pounds per barrel (4.275 to 21.375 kg/m$^3$). It is envisioned that the surface area loading factor discussed above is achieved through the combination of these loading limits and the above discussed surface area limitations. Specifically, as discussed above, in one or more embodiments, the carbon black may have a surface area between about 125 and 1500 m$^2$/g. In more particular embodiments, the carbon black may have a surface area of at least about 200 m$^2$/g, or at least 500 m$^2$/g, or at least 700 m$^2$/g, or at least about 800 m$^2$/g, or at least about 900 m$^2$/g, or at least about 1000 m$^2$/g, or at least about 1100 m$^2$/g, or at least about 1200 m$^2$/g, or at least about 1300 m$^2$/g, or at least 1400 m$^2$/g and/or up to 1500 m$^2$/g.

The surface chemistry of the carbon black may also play a role in their potential conductive properties. Most carbon blacks are known to have surfaces that contain organic surface groups including polyaromatic hydrocarbons (PAH), lactones, chinones, phenolics, and carboxylics, which may be otherwise known as 'volatiles'. Too high of a concentration of these volatiles may act as a barrier for the electron-tunneling effect thought to provide the electroconductivity. In one or more embodiments, carbon black used in the wellbore fluids of the present disclosure may have a volatile content below about 1% by weight, or below about 0.85% by weight, or below about 0.7% by weight.

The resulting conductivity of the wellbore fluid is a function of the conductive carbon black particles aggregates formed from break down and dispersion of the agglomerates or pellets added into the oleaginous base fluid. The electrical conductivity, k, of an oil base is typically in the range $10^{-6}$ to $5 \times 10^2$ µS.m$^{-1}$ at a frequency of 1 kHz, while an electrical conductivity of no less than 10 µS.m$^{-1}$ or of no less than $10^3$ µS.m$^{-1}$ is desirable for electrical logging operations. In such embodiments, the usefulness of the conductive carbon black aggregates or pellets as described herein is primarily attributed to its low density and its ability to dissipate accumulated static charges, as well as to prevent the build-up of static charges. The electrical conductivity of carbon black is inversely proportional to the specific resistivity thereof.

In one or more embodiments, the wellbore fluid may have a conductivity of at most 0.02 siemens per meter (S/m) when measured at 20 kHz. Further, it is relevant that the conductivity exists in the filtercake without breaking the emulsion. Breaking of the emulsion would independently result in conductivity due to the availability of the aqueous saline phase broken free from the emulsion. However, from a fluid stability perspective, it is not desirable for the emulsion to break (or the mud to fall apart) downhole during drilling and formation of the filtercake. Thus, in one or more embodiments, the filtrate collected from an API HPHT Fluid Loss test on the wellbore fluids of the present disclosure is substantially free of separated water (as compared to emulsified water). Specifically, in one or more embodiments, the filtrate has less than 10 percent of the portion of water in the fluid phase separate following an API HPHT Fluid Loss Test. That is, for an invert emulsion that is 80% oil and 20% water, less than 10% of the 20% water portion may phase separate from the emulsion. In more specific embodiments, the amount of phase separated non-oleaginous fluid in the filtrate is less than about 5% by volume of the amount of non-oleaginous fluid in the original wellbore fluid. Further, it is noted that the API HPHT Fluid Loss test may have at least 1 mL of filtrate collected, which may indicate that a filtercake is formed. In one or more embodiments, the conductivity arises through the formation of a filtercake and therefore, the formation in which the fluid is used should have a permeability at least in the millidarcy range to ensure that a filtercake forms during the wellbore operations. Further, drilling in an overbalanced condition may also aid in formation of a filtercake, depending on the permeability of the formation.

However, some shales have a permeability in the nanodarcy range and a substantial filtercake may not be expected to form during wellbore operations. In these situations, a higher loading (i.e., greater than about 10 pounds per barrel) of carbon materials may be used in the wellbore fluid to increase the conductivity of the fluid itself and thereby enable effective resistivity imaging.

The rheological profile of the fluid is impacted by the degree of loading of the carbon materials. Fluids having carbon materials of the present disclosure incorporated therein may result in sufficient electrical conductivity for the filtercake while also arriving at acceptable rheological properties for drilling (and pumping downhole). One of ordinary skill in the art will appreciate that the precise rheological profile of a drillable fluid may depend on the formation (whether the formation can tolerate a thicker mud without fracturing), but generally, the fluids having the described carbon black loading may have a plastic viscosity of about 20-35 cP and yield point of less than about 35 lb/100 ft$^2$. Further, the fluid may also have a GELS value ranging from 5-20 lb/100 ft$^2$, the GELS being a measure of the suspending characteristics or the thixotropic properties of a fluid, measured after 10 seconds and/or 10 minutes.

Thus, the use of a resistive wellbore fluid (having a conductivity of at most 0.02 siemens per meter (S/m) when measured at 20 kHz) containing otherwise conductive carbon materials to form a conductive wellbore fluid and a conductive filtercake containing at least some of said conductive carbon materials upon the fluid's injection downhole may allow for beneficial rheological properties to be achieved by the wellbore fluid. For example, the rheological properties may be enhanced as a result of the reduced necessity for high loadings of conductive carbon materials in the fluid in order to make the wellbore fluid itself conductive. The enhanced rheological properties may allow for the wellbore fluid to be easily pumpable, used during a drilling or other wellbore operation, and capable of efficient particle suspension with low sag.

As mentioned above, wellbore fluids described herein may be oil-based wellbore fluids or invert emulsions in one or more embodiments. Suitable oil-based or oleaginous fluids may be a natural or synthetic oil and in some embodiments, the oleaginous fluid may be selected from the group including diesel oil; mineral oil; a silicone oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

The invert emulsion fluid may also possess a stable internal non-oleaginous phase within the external oleaginous phase. Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of oleaginous liquid in the invert emulsion fluid may vary depending upon the particular oleaginous fluid used, the particular non-oleaginous fluid used, and the particular application in which the invert emulsion fluid is to be employed. However, in some embodiments, the amount of oleaginous liquid may be sufficient to form a stable emulsion when used as the continuous phase. In some embodiments, the amount of oleaginous liquid may be at least about 30, or at least about 40, or at least about 50 percent by volume of the total fluid. The amount of non-oleaginous liquid in the invert emulsion fluid may vary depending upon the particular non-oleaginous fluid used and the particular application in which the invert emulsion fluid is to be employed. In some embodiments, the amount of non-oleaginous liquid may be at least about 1, or at least about 3, or at least about 5 percent by volume of the total fluid. In some embodiments, the amount may not be so great that it cannot be dispersed in the oleaginous phase. Therefore, in certain embodiments, the amount of non-oleaginous liquid may be less than about 70, or less than about 60, or less than about 50 percent by volume of the total fluid.

Wellbore Fluid Additives

The wellbore fluids of the present disclosure may further contain additives so long as the additives do not interfere with the properties of the compositions described herein. For example, emulsifiers, wetting agents, organophilic clays, viscosifiers, weighting agents, bridging agents, fluid loss control agents, and corrosion inhibitors may be added to the compositions disclosed herein so as to impart additional functional properties.

Wetting agents and emulsifiers that may be suitable for use include, but are not limited to, crude tall oil, oxidized crude tall oil, surfactants, organic phosphate esters, ether carboxylic acids, fatty amines, amidoamines, modified imidazolines and amidoamines, fatty acid amidoamines (including dry fatty acid amidoamines) and salts thereof, alkyl aromatic sulfates and sulfonates, and the like, and combinations or derivatives of these. VERSAWET™ and VERSACOAT™, NOVAMUL™, FAZEMUL™, FAZEWET™, MEGAMUL™, SUREMUL™, ONEMUL™, ACTIMUL RD™, and MUL-XT™ are non-limiting examples of commercially available emulsifiers manufactured and distributed by M-I, L.L.C. that may be used in the fluids and methods of this disclosure. Other suitable surfactants that are commercially available include SILWET™ series of emulsifiers such as L-77, L-7001, L7605 and L-7622, which are distributed by Union Carbide Chemical Company Inc.

In other embodiments, the emulsifier may be a carboxylic acid-based emulsifier such as, for example, an emulsifier selected from dicarboxylic fatty acids, dimer acids, or dimers of fatty acids. Dicarboxylic fatty acids have the general formula HOOC—R—COOH, wherein R is an alkyl or alkenyl group containing from 10 to 50 carbon atoms, and in particular embodiments from 20 to 40 carbon atoms. In other embodiments, emulsifiers may be selected from the dimerization products of unsaturated dicarboxylic fatty acids, for example, such as products prepared by dimerization of unsaturated fatty acids containing from 8 to about 18 carbon atoms, including 9-dodecenoic(cis), 9-tetradecenoic (cis), 9-octadecenoic(cis), octadecatetranoic acids and the like.

Organophilic clays, normally amine treated clays, may be useful as viscosifiers in the fluid compositions disclosed herein. Other viscosifiers and gellants, such as oil soluble polymers, polyamide resins, polycarboxylic acids and soaps may also be used. Attapulgite clay and sepiolite clay may also be used as viscosifiers. The amount of viscosifier used in the compositions may vary depending on downhole conditions, as understood by those skilled in the art. However, normally about 0.1% to 6% by weight range may be sufficient for most applications. VG-69™, VG-SUPREME™, VG-HT™, and VG-PLUS™ are organoclay available from M-I, L.L.C. (Houston, Tex.), and VERSA-HRP™ is a polyamide resin material available from M-I L.L.C. (Houston, Tex.) that may be used in the fluids and methods of this disclosure.

Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL-HT™, and latex polymers. In embodiments, the fluid loss control agent may be selected from one or more of VERSATROL™, VERSATROL™, VERSALIG™, ECOTROL™ family of products, ONETROL-HT™, EMI 789, and NOVATECH™ F, which are all commercially available from MI SWACO (Houston, Tex.).

Corrosion inhibitors may also be added to the drilling fluids disclosed herein to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, and benzoic acid derivatives, phosphate esters, heterocyclic nitrogen and sulfur compounds, organic acids, and the like. Non-limiting examples of commercially available corrosion inhibitors include sodium benzoate and benzotriazole.

Weighting agents or density materials suitable for use in wellbore fluid formulations in accordance with the present disclosure include, but are not limited to, hematite, magnetite, iron oxides, illmenite, barite, siderite, celestite, dolomite, calcite, manganese oxides, halites and the like. In other embodiments, the micronized weighting agents may be coated with a dispersant.

In one or more embodiments, the weighting agent may be coated, for example, with dispersants such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used, such as HYPERMER™ OM-1 (Imperial Chemical Industries, PLC, London, United Kingdom) or polyacrylate esters, for example. Such polyacrylate esters may include polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

The quantity of the coated or uncoated weighting agent added, if any, may depend upon the desired density of the final composition. Weighting agents may be added to result in a density of up to about 22 pounds per gallon (ppg). In other embodiments, the weighting agent may be added to achieve a density of up to 20 ppg or up to 19.5 ppg.

The wellbore fluids as described herein may be prepared by using various methods. For example, conventional methods may be used to prepare the wellbore fluids in a manner analogous to those normally used, to prepare conventional oil-based drilling fluids. In one representative embodiment, a desired quantity of oleaginous base fluid such as a base oil and a plurality of conductive carbon black agreggates or pellets in a suitable amount, are mixed together and the remaining components (if necessary) are added sequentially with continuous mixing. An invert emulsion of the present disclosure is formed by vigorously agitating, mixing or shearing the oleaginous fluid and the non-oleaginous fluid.

Upon mixing, the fluids of the present embodiments may be used in wellbore operations, such as logging a subterranean well. Such operations are known to persons skilled in the art and involve pumping a wellbore fluid into a wellbore through an earthen formation and performing at least one logging operation while the wellbore fluid is in the wellbore.

One embodiment of the present disclosure involves a method of formulating an oil-based wellbore fluid. In one such illustrative embodiment, the method includes adding at least a plurality of conductive carbon black agglomerates or pellets having an average size of at least 500 μm to an oleaginous base fluid and applying energy to the oil-based wellbore fluid to disperse the plurality of conductive carbon black agglomerates or pellets into the oleaginous base fluid as finer particles than the agglomerates or pellets. In one or more embodiments, the method of formulating a wellbore fluid includes providing an oleaginous base fluid, providing a plurality of conductive carbon black agglomerates or pellets having an average size of at least 500 μm, adding the plurality of conductive carbon black agglomerates or pellets to the oleaginous base fluid and applying energy to the oil-based wellbore fluid to disperse the plurality of conductive carbon black agglomerates or pellets into the oleaginous base fluid as finer particles than the aggregates or pellets. As noted above, the plurality of conductive carbon black agglomerates or pellets may be added to the oleaginous base fluid in an amount so as to permit the electrical logging (such as electrical resistivity measurements) of the subterranean well by the increased electrical conductance of the wellbore fluid. According to the present embodiments, the oil-based wellbore fluids formulated as described herein may have an electrical conductivity of at most 0.02 S/m when measured at 20 kHz. According to various embodiments, after pumping the oil-based wellbore fluid into a subterranean well, the oil-based wellbore fluid may be circulated in the subterranean formation, while drilling with overbalanced conditions or during another wellbore operation. Following the circulation, a logging tool may be used in the wellbore to perform electrical resistivity measurements of the subterranean well. Electrical logging and imaging operations may be performed during a drilling operation, for example, while drilling in the reservoir region of an oil/gas well in order to determine the type of formation and the material therein. Such information may be used to optimally locate the pay zone, i.e., where the reservoir is perforated in order to allow the inflow of hydrocarbons to the wellbore.

Drilling/circulating the fluid in overbalanced conditions may include a pressure differential of at least 150 psi and up to the fracture gradient of the formation, such that a filtercake is formed on the walls of the formation preventing both the filtration of formation fluids into the wellbore and the loss of wellbore fluids into the formation. For example, filtercakes may be formed when the conductive carbon black aggregates, as well as other particles suspended in the oil-based wellbore fluid coat and plug the pores in the subterranean formation, such that the filtercake acts as a barrier and decreases the fluid permeability of the wellbore. In such embodiments, the conductive carbon black aggregates impart electrical conductivity to the filtercake formed on permeable rock formations. In such embodiments, the filtercake formed on at least a portion of a wall of the wellbore has a conductivity of at least two orders of magnitude higher than the oil-based wellbore fluid. This conductive filtercake may be useful for performing resistivity measurements on the formation in order to characterize the reservoir. Thus, following the circulation, a logging tool may be used in the wellbore to perform resistivity measurements.

After any wellbore operations have been accomplished, filtercakes (formed for example during drilling and/or completion) remaining on the sidewalls of the wellbore may be broken by application of a breaker fluid that degrades the constituents of the filter cake formed. The breaker fluid may be circulated in the wellbore during or after the performance of the at least one completion operation. In other embodiments, the breaker fluid may be circulated either before, during, or after a completion operation has commenced to destroy the integrity of and clean up residual drilling fluids remaining inside casing or liners. The breaker fluid may contribute to the degradation and removal of the filtercake deposited on the sidewalls of the wellbore to minimize negatively impacting production. Upon cleanup of the well, the well may then be converted to production.

In some embodiments, during logging and while using the oil-based wellbore fluids as described herein, wireline logs may be used to take measurements of the relative resistivity of the formation. The measurements of relative resistivity of the formation may be used to determine geological composition of the downhole formation. Also, such resistivity measurements may be useful to determine the location of the drill bit to enhance geosteering capabilities and directional drilling control. In some embodiments, the oil-based wellbore fluids disclosed herein may be used with drilling systems having a measurement-while-drilling ("MWD") system. For example, drilling and formation data and parameters may be determined from various downhole measuring devices and may be transformed downhole into selected parameters of interest and then transferred by telemetry to the surface.

In other embodiments, the measurements may be stored downhole for subsequent retrieval, or they may be both transferred via telemetry to the surface and/or stored downhole. In one or more embodiments, measurements may be depth-correlated, using depth measurements made downhole for improving the accuracy of the measurements and the parameters of interest. In one or more embodiments, the measurements and/or parameters may be correlated with stored reference data for providing additional information pertaining to the drilling operations and the formation characteristics. Thus, the logging measurements may be used to determine the drill bit location relative to the desired drilling path and to adjust the drilling activity downhole. Therefore, such electrical logs and other wireline log techniques may determine the nature of the geology and the reservoir properties of the petroleum bearing formations penetrated by the well, as well as other properties of the drilling process, such as the location of the drill bit.

Advantageously, embodiments disclosed herein provide oil-based wellbore fluids with improved levels of conductivity that allow electrical logging within a wellbore. Another aspect of the present disclosure is that the conductive oil-based wellbore fluids as described herein may maintain the performance advantages expected for known oil-based wellbore fluids with regard to enhanced lubricity, reduced differential sticking of drill pipe, and good stability at high temperatures. Furthermore, the oil-based wellbore fluids of the present disclosure may provide reduced environmental and health risks, as the conductive carbon black agglomerates or pellets are dispersed, upon applying energy, into the oleaginous based fluid as finer particles than the agglomerates or the pellets after their addition to the oleaginous fluid.

Although only a few example embodiments have been described in detail above, those skilled in the art will readily appreciate that many modifications are possible in the example embodiments without materially departing from this invention. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of formulating at least one oil-based wellbore fluid, the method comprising:
    providing conductive carbon black agglomerates comprising physically fused primary carbon black particles that form carbon black aggregates having branched and fibroid-like structures entangled to form the conductive carbon black agglomerates, wherein the carbon black aggregates have, when measured using Di-Butyl-Phthalate (DBP) absorption method, a pore volume of at least about 200 $cm^3$ DBP/100 g carbon black and up to about 500 $cm^3$ DBP/100 g carbon black, and further wherein conductive carbon black agglomerates have an average size of 500 µm to 5 mm;
    adding the conductive carbon black agglomerates to an oleaginous base fluid to form an oil-based wellbore fluid; and
    applying energy to the oil-based wellbore fluid by shearing or at least one dispersion method to disperse the conductive carbon black agglomerates into the oleaginous base fluid as finer particles than the conductive carbon black agglomerates.

2. The method of claim 1, further comprising: circulating the oil-based wellbore fluid in a subterranean well.

3. The method of claim 2, further comprising performing electrical resistivity measurements of the subterranean well.

4. The method of claim 2, wherein the conductive carbon black agglomerates are added to the oleaginous base fluid in an amount so as to permit electrical logging of the subterranean well.

5. The method of claim 1, wherein the oleaginous base fluid is selected from the group of diesel oil, a natural oil, a synthetically derived oil, a mineral oil, a silicone oil, or a combination thereof.

6. The method of claim 1, wherein the oil-based wellbore fluid has an electrical conductivity of at most 0.02 S/m when measured at 20 kHz.

7. The method of claim 6, further comprising: forming a filtercake with the oil-based wellbore fluid on at least a portion of a wall of a subterranean well, wherein the filtercake has an electrical conductivity of at least two orders of magnitude higher than the oil-based wellbore fluid.

8. The method of claim 1, wherein the at least one dispersion method comprises mixing, stirring, sonicating, or a combination thereof.

9. A method of formulating an oil-based wellbore fluid, the method comprising:
providing an oleaginous base fluid;
providing conductive carbon black agglomerates comprising physically fused primary carbon black particles that form carbon black aggregates having branched and fibroid-like structures entangled to form the conductive carbon black agglomerates, wherein the primary carbon black particles have a volatile content below about 1% by weight, and further wherein conductive carbon black agglomerates have an average size of 500 μm to 5 mm;
adding the conductive carbon black agglomerates to the oleaginous based fluid to form an oil-based wellbore fluid; and
applying energy to the oil-based wellbore fluid by shearing or at least one dispersion method to disperse the conductive carbon black agglomerates into the oleaginous base fluid as finer particles than the conductive carbon black agglomerates.

10. The method of claim 9, further comprising: circulating the oil-based wellbore fluid in a subterranean well.

11. The method of claim 10, further comprising: performing electrical resistivity measurements of the subterranean well.

12. The method of claim 9, wherein the oleaginous base fluid is selected from the group of diesel oil, a natural oil, a synthetically derived oil, a mineral oil, a silicone oil, or a combination thereof.

13. The method of claim 9, wherein the conductive carbon black agglomerates are added to the oleaginous base fluid in an amount so as to permit electrical logging of a subterranean well.

14. The method of claim 9, wherein the oil-based wellbore fluid has an electrical conductivity of at most 0.02 S/m when measured at 20 kHz.

15. The method of claim 14, further comprising: forming a filtercake with the oil-based wellbore fluid on at least a portion of a wall of a subterranean well, wherein the filtercake has an electrical conductivity of at least two orders of magnitude higher than the oil-based wellbore fluid.

16. The method of claim 9, wherein the at least one dispersion method comprises mixing, stirring, sonicating, or a combination thereof.

17. The method of claim 9, wherein the volatile content of the primary carbon black particles is below about 0.7% by weight.

* * * * *